3,523,927
RAPID, BLOOM-FREE CURING OF ETHYLENE COPOLYMERS WITH BUTYRALDEHYDE-BUTYLAMINE CONDENSATE OR N,N'-DIBUTYL THIOUREA
Fred D. Shaw, Jr., Newark, Del., assignor to E. I. du Pont de Nemours and Company, Wilmington, Del., a corporation of Delaware
No Drawing. Filed Jan. 24, 1967, Ser. No. 611,225
Int. Cl. C08f 27/06; C08c 11/18
U.S. Cl. 260—79.5                    5 Claims

ABSTRACT OF THE DISCLOSURE

Curing of black-loaded ethylene copolymers (e.g., ethylene, propylene, 1,4-hexadiene terpolymers) in the presence of sulfur, zinc oxide, mercaptobenzothiazole and certain specific thiuram or dithiocarbamates plus the presence of N,N'-dibutyl thiourea or a butylamine-butyraldehyde condensation product. Rapid, uniform cures are obtained without surface bloom.

BACKGROUND OF THE INVENTION

Field of the invention

This invention relates to the sulfur curing of ethylene copolymers and, more particularly, to the sulfur curing of such copolymers in the presence of specific compounding ingredients to produce bloom-free, uniformly-cured, vulcanizates.

Description of the prior art

Sulfur-curable hydrocarbon copolymers of ethylene and non-conjugated hydrocarbon dienes are being manufactured today on a large scale for the preparation of many valuable articles of commerce. For some of these applications, such as automobile window seals, the copolymers are extended with carbon black and petroleum oil and fabricated into products having both thin and thick sections. For economic reasons it is desirable to be able to cure these articles as rapidly as possible. The curing compositions presently employed leave something to be desired.

Some of the curing recipes tried produce vulcanizates which gradually develop an undesired surface bloom. The exact cause of this phenomenon is not understood, but it is believed that it results from migration of one or more of the polar curing compounds or residues therefrom to the surface of the hydrocarbon polymer with which it is not wholly satisfactorily compatible. Even though these vulcanizates may be satisfactory in every other way, the decreased aesthetic appeal hinders customer acceptance. Typically, bloom has developed in vulcanizates which have been cured with recipes containing N,N'-diphenylthiourea, tetramethyl thiuram disulfide, or zinc dimethyl dithiocarbamate.

Attainment of a uniformly satisfactory cure is difficult when the article has both thick and thin sections. The thinner sections tend to overcure with loss of tensile strength and tear strength. At the same time, the thicker sections tend to be undercured with the consequent development of undesirable porosity. While bloom-resistant curing systems are known, they typically require undesirably long curing times.

SUMMARY OF THE INVENTION

It has unexpectedly been found that rapid, uniform cures can be obtained without significant surface bloom in the vulcanization of black-loaded ethylene copolymers, containing units of open-chain, non-conjugated hydrocarbon dienes, in the presence of (a) sulfur, (b) zinc oxide, (c) mercaptobenzothiazole or 2,2'-dithiobisbenzothiazole, and (d) a compound selected from the group consisting of (1) tetramethyl thiuram disulfide, (2) tellurium diethyl dithiocarbamate, (3) dipentamethylene thiuram tetrasulfide, (4) zinc dibutyl dithiocarbamate, and mixtures thereof, by the improvement of incorporating before cure (A) N,N'-dibutyl thiourea, or (B) a butyraldehyde-butyl amine condensation product, or mixtures thereof.

DESCRIPTION OF THE PREFERRED EMBODIMENTS

Ethylene copolymers suitable for use in the present invention are described in U.S. Pat. 2,933,480. The preferred copolymers are made from ethylene and an open-chain non-conjugated diene having only one terminal carbon-carbon double bond; optionally, another alpha-monoolefin is included. A preferred diene is 1,4-hexadiene; the preferred other alpha-monoolefins are the lower alkyl members such as propylene or 1-butene which are commercially available in large quantities at low cost. The particularly preferred copolymer is made from ethylene, propylene, and 1,4-hexadiene; illustrations of its use are given in the examples which follow.

Since copolymers having narrow molecular weight distributions exhibit long induction times before the cure takes place at a desirably rapid rate, such copolymers may need the invention more than those having a broader molecular weight distribution.

The curability of the copolymer depends in part upon the amount of carbon-carbon bonds available as sulfur cure sites; in order to achieve practical rates, it is preferred that the copolymer contain at least about 0.3 gram-mole of carbon-carbon double bonds per kilogram of copolymer. In the case of copolymers made with 1,4-hexadiene, this requirement corresponds to about 4 wt. percent total diene units present.

The copolymer composition being cured generally contains carbon black and, optionally, a conventional petroleum oil. The type of carbon black is not critical. Since aromatic petroleum oils tend to interfere with the cure, paraffinic and naphthenic oils are preferred. The concentrations of black and oil will be selected by those skilled in the art to meet the cost requirements and the operating characteristics of the vulcanizate for the desired application. It is to be understood that the tendency toward vulcanizate bloom increases as the oil concentration is increased (e.g., as oil/black weight ratio exceeds 1.0). Stocks so extended that the Shore A hardness is below 40 are sometimes too soft for complete satisfaction. The invention can be used in stocks containing wide ranges of carbon black (e.g., 75 to 200 phr.) and processing oil (e.g. 50 to 150 phr.).

When desired for special purposes, minor amounts of mineral fillers such as hard clays can be present in addition to the carbon black; however, the advantage of the curing system of the present invention tends to be correspondingly diminished as the mineral filler concentration increases. There is usually no particular advantage in employing the curing system with stocks only loaded with mineral fillers.

The heart of the present invention is the incorporation of a critically selected activator system for a conventional sulfur curing system which contains sulfur (preferably 0.5 to 3 phr.), zinc oxide (preferably 3 to 20 phr.), and 2-mercaptobenzothiazole or 2,2' - dithiobisbenzothiazole (preferably 0.2 to 2 phr.). Rapid curing and freedom from bloom are achieved by employing N,N'-dibutyl thiourea ["Pennzone B"] or a butyraldehyde butylamine condensation product ["833 Accelerator"] as an additional activating agent in combination with selected thiuram compounds. The examples which follow present illustrations of these advantages. Stocks containing N,N'-dibutyl thiourea display flatter cure curves, a behavior which enables their thick sections to be cured sufficiently to avoid porosity; at the same time their thinner sections suffer only a minimum amount of overcure, enabling them to maintain adequate tensile and tear strength.

In general, the proportion of N,N'-dibutyl thiourea used in the curable composition will be in the range of about 0.1–2 parts per 100 parts by weight of the copolymer. The preferred concentration values lie in the range of about 0.2 part to 0.5 part. The butyraldehyde-butylamine condensation product can be used in place of part or all the thiourea. If the concentration exceeds 0.5 phr. and the curing is done at a temperature greater than 290° F., the vulcanizate surface often becomes coated with a thin layer of a greasy material on long standing. The gloss and "feel" are changed. Analysis shows that this coating is a polyethylene. This is not generally called bloom because it is not derived from residues of the curing system.

When a particularly good state of cure is desired, it is preferred to use a small proportion of tellurium diethyl dithiocarbamate in combination with N,N'-dibutyl thiourea. The latter contributes to the desired rapid early cure and the tellurium compound provides the improved ultimate state of cure.

The selected thiuram compounds (conventional components in sulfur curing systems) contain in their molecule the following structural unit:

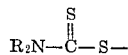

Representative examples of these compounds include tetramethylthiuram disulfide ["Thiuram M"], tellurium diethyl dithiocarbamate ["Tellurac"], dipentamethylene thiuram tetrasulfide ["Tetrone A"], and zinc dibutyl dithiocarbamate. Particularly advantageous concentrations are illustrated in the examples which follow. A thiuram compound should be present; the minimum amount needed for a satisfactory cure can be readily determined by those skilled in the art by routine experimentation. There is usually no extra advantage in using an excessive amount of the thiuram compound, and there is a possibility that bloom may be produced. Generally, not more than about 1 phr. or less than about 0.25 phr. total thiuram compounds will be used. Not all thiuram compounds can be employed; for example, zinc dimethyl dithiocarbamate causes bloom.

The curable compositions can be compounded on the equipment familiar to those skilled in the rubber art. Rubber roll mills or internal mixers such as Banbury mixers are typical.

Conventional cure temperatures can be employed; it is preferred, when the maximum freedom from bloom is desired, to cure at temperatures between about 270° to 300° F.

In determining rapidity of cure, a convenient test is the use of an oscillating disc rheometer (ODR) after selected times that a test piece is held at curing conditions. The test is run using a Monsanto Oscillating Disc Rheometer (available from Monsanto Chemical Co., St. Louis, Mo.) and the Operation and Service Manual amplifies this disclosure with respect to many details. Briefly, the ODR measures the relative viscosity of an elastomer by oscillating (e.g., at 900 c.p.m.) a grooved, conical disc through a 3° arc while pressed tightly between two test pieces. The amount of torque required to oscillate the disc is reported as the measure of viscosity.

The calculation of the "time to no porosity" can be made as follows: A pellet is made by stacking up 85–100 mil. sheets or wafers of elastomer to a height of about 0.75 inch and compressing this to about 0.5 inch at the desired curing temperature. After a desired curing time interval, the pellet is released and cut open and examined for porosity. Using a number of pellets, each held for different cure times, the time can be determined at which porosity is eliminated.

The invention will now be described with reference to the following examples of specific embodiments thereof wherein parts and percentages are by weight unless otherwise specified, and "phr." means parts per 100 parts of polymer.

Example 1.—A rubber is selected which is a rubber-like hydrocarbon copolymer (hereinafter EPH) having about 0.33 gram-mole C=C/kilo. made by reacting ethylene, propylene, and 1,4-hexadiene in tetrachloroethylene in the presence of a coordination catalyst prepared by mixing vanadium oxytrichloride and diisobutyl aluminum monochloride in accordance with the general procedures of U.S. Pat. 2,933,480. EPH has a Mooney viscosity (ML–4/250° F.) of about 70 and an inherent viscosity of about 3.7 (measured at 30° C. on a solution of 0.1 gram of copolymer in 100 ml. of tetrachloroethylene). The typical monomer unit composition is: 63 mole percent ethylene, 35.3 mole percent propylene, and 1.7 mole percent 1,4-hexadiene.

A Banbury internal mixer model OOC having a capacity of 4320 cc. is used to prepare a black/oil-extended EPH masterbatch. The Banbury is operated at a speed of 85 r.p.m. and a ram pressure of 50 p.s.i. while being cooled by circulating ambient temperature water. A 900-gram (100 parts) charge of EPH, 450 grams (50 parts) of FEF carbon black, 45 grams (5 parts) ZnO, 270 grams (30 parts) of MT carbon black, 540 grams (60 parts) of the naphthenic petroleum oil ("Circosol 2XH") and 9 grams (1 part) of stearic acid are introduced substantially all at once. After about thirty seconds total elapsed time, 450 additional grams (50 parts) of FEF carbon black and 270 additional grams (30 parts) of MT carbon black are charged into the Banbury. After 4 minutes total elapsed time, the resulting masterbatch is dumped; its temperature then is about 230° F.

The masterbatch is then compounded on a rubber roll mill at about 120–130° F. with the following curing agents:

| Component | Grams | Parts |
|---|---|---|
| Sulfur | 13.5 | 1.5 |
| Tetramethylthiuram disulfide | 6.8 | 0.75 |
| Bispentamethylene thiuram tetrasulfide | 6.8 | 0.75 |
| 2-Mercaptobenzothiazole | 13.5 | 1.5 |

Four stocks [A–D] are compounded on a rubber roll mill at 120–130° F. by adding 0.25, 0.5, 1.0, and 1.5 phr., respectively, of N,N'-dibutyl thiourea to portions of the EPH masterbatch prepared above. The processing safety characteristics of the stocks and typical properties (at 25° C.) of the vulcanizates are given in the table below.

| | A | B | C | D |
|---|---|---|---|---|
| N,N'-dibutyl thiourea content (phr.) | 0.25 | 0.5 | 1.0 | 1.5 |
| Mooney Scorch (MS/250° F.): | | | | |
| Minimum | 35 | 36 | 35 | 35 |
| Time to 10-Point Rise (min.) | 11 | 9 | 8 | 8 |
| ODR at 290° F.: | | | | |
| ODR at 290° F.: Torque at— | | | | |
| 2.5 min | 7 | 7 | 8 | 9 |
| 5 min | 17 | 19 | 20 | 20 |
| Time to No Porosity at 290° F. (min.) | 6 | 5.5 | 5.5 | 5.25 |
| Vulcanizate Properties (after 5-min. cure at 290° F.): | | | | |
| Modulus at 300% Extension (p.s.i.) | 550 | 600 | 550 | 510 |
| Tensile Strength (p.s.i.) | 950 | 1,000 | 1,050 | 950 |
| Elongation at Break (percent) | 780 | 720 | 820 | 780 |
| Permanent Set at Break (percent) | 70 | 60 | 70 | 68 |
| Shore A hardness | 62 | 61 | 62 | 60 |
| Vulcanizate Properties (after 10-min. cure at 320° F.): | | | | |
| Modulus at 300% Extension (p.s.i.) | 1,375 | 1,375 | 1,300 | 1,300 |
| Tensile Strength (p.s.i.) | 1,750 | 1,800 | 1,750 | 1,700 |
| Elongation at Break (percent) | 460 | 480 | 500 | 500 |
| Permanent Set at Break (percent) | 15 | 15 | 18 | 20 |
| Shore A hardness | 68 | 64 | 62 | 63 |
| Bloom Development | None | None | None | None |

If in stock C above, the N,N'-dibutyl thiourea is replaced with 1 part of N,N'-diphenyl thiourea, it will be noted that a substantial bloom develops on the vulcanizate.

Example 2.—A stock is prepared in a Banbury mixer according to the procedure of Example 1 using the following recipe:

| Component: | Parts |
|---|---|
| EPH | 100 |
| ZnO | 5 |
| FEF carbon black | 80 |
| Paraffinic petroleum oil ("Sunpar 150") | 95 |
| Stearic acid | 1 |

It is then further compounded on a rubber roll mill with:

| Component: | Parts |
|---|---|
| Sulfur | 2 |
| 2-Mercaptobenzothiazole (MBT) | 1.0 |
| N,N'-Dibutylthiourea | 0.8 |
| Zinc dibutyl dithiocarbamate | 2.0 |
| Tetramethyl thiuram disulfide | 0.8 |

The thick section of an automobile C-V (corner vent) window seal molded from this stock is noted to be dense after only about 6 minutes at 330° F.

By comparison a corner vent window seal containing a known bloom resistant curing system, which employs 1.5 phr. MBT and 0.8 phr. each of tellurium diethyl dithiocarbamate and bispentamethylene thiuram tetrasulfide, instead of the thiourea and zinc compounds above, is still porous after 6 min. cure at 330° F., and requires about 8 minutes to become dense.

Example 3.—A stock is prepared exactly in accordance with stock C of Example 1, except that 0.75 phr. of N,N'-dibutyl thiourea (instead of 1.0 part) is used, and 0.25 tellurium diethyldithiocarbamate is also added therewith. Typical properties are as follows:

Mooney scorch (MS/250° F.):
  Minimum _____ 35
  Time to 10-point rise (min.) _____ 8

ODR at 290° F., Torque at:
  2.5 min. _____ 8
  5 min. _____ 21

Time to no porosity at 290° F. (min.) _____ 5

Vulcanizate properties, after 5-min. cure at 290° F.:
  Modulus at 300% extension (p.s.i.) _____ 875
  Tensile strength (p.s.i.) _____ 1400
  Elongation at break (percent) _____ 620
  Permanent set at break (percent) _____ 33
  Shore A hardness _____ 62

Vulcanizate properties after 10-min. cure at 320° F.:
  Modulus at 300% extension (p.s.i.) _____ 1500
  Tensile strength (p.s.i.) _____ 1800
  Elongation at break (percent) _____ 420
  Permanent set at break (percent) _____ 10
  Shore A hardness _____ 64
Bloom development of both vulcanizates _____ None It will be noted that the properties above are even superior to those indicated for Stock C of Example 1.

If, for comparison, the thiourea component is omitted and the tellurium component is increased to 0.75 phr., the ODR torque at 5 minutes will only be about 12, indicating a less rapid cure.

Example 4.—A stock is prepared using the following recipe:

| Component: | Parts |
|---|---|
| EPH | 100 |
| ZnO | 5 |
| FEF carbon black | 80 |
| Paraffinic petroleum oil ("Sunpar 150") | 95 |
| Stearic acid | 1 |
| Sulfur | 2 |
| Tetramethyl thurium disulfide | 0.5 |
| 2-mercaptobenzothiazole | 1.0 |
| Zinc dibutyl dithiocarbamate | 2.0 |
| Butyraldehyde-butylamine condensation product ("Accelerator 833") | 1.0 |

The composition is prepared as follows: At the start, the EPH, ZnO, FEF carbon black, stearic acid, and ⅔ of the oil are added substantially all at once to a water-cooled Banbury (Model OOC) operated first at 62 r.p.m., later at 85 r.p.m. Half the remaining oil is added after 2 minutes, the rest after 4 minutes; then agitation is continued for 4 more minutes. The stocks, dumped at about 225° F., are transferred to a rubber roll mill and compounded at about 120–130° F.

A typical ODR test specimen made from the composition indicates the following data:

ODR at 290° F., at: Torque
  0 min. _____ 2
  2.5 min. _____ 3
  5 min. _____ 8
  7.5 min. _____ 11
  10 min. _____ 13
  20 min. _____ 18
  30 min. _____ 21
Time to no porosity, at:
  290° F. _____ 7–7.5 min.
  335° F. _____ 4.5 min.

Thin test slabs indicate the following typical vulcanizate properties:

Cured 4'/335° F.:
  Modulus at 300% Ext. (p.s.i.) _____ 210
  Tensile strength (p.s.i.) _____ 1850
  Elongation at break (percent) _____ 1060
  Permanent set at break (percent) _____ 38
  Shore A hardness _____ 31
Cured 8'/335° F.:
  Modulus at 300% Ext. (p.si.) _____ 300
  Tensile strength (p.s.i.) _____ 1850
  Elongation at break (percent) _____ 900
  Permanent set at break (percent) _____ 30
  Shore A hardness _____ 33

Example 5.—EPH' is made by copolymerizing ethylene, propylene, and 1,4-hexadiene in tetrachloroethylene in the presence of a coordination catalyst made by mixing vanadium tetrachloride with diisobutyl aluminum monochloride. The copolymer has the following approximate monomer unit composition by weight: 33% propylene, 4% 1,4-hexadiene, with the remainder being ethylene. The Mooney viscosity (ML–4/250° F.) is about 50.

The Banbury of Example 1 is employed and charged all at once with the following recipe:

| Component | Grams | Parts |
|---|---|---|
| EPH' | 916 | 100 |
| FEF Black | 500 | 55 |
| MT Black | 300 | 33 |
| Petroleum oil (Circosol 2XH) | 400 | 44 |
| ZnO | 45.8 | 5 |
| Stearic Acid | 9 | 1 |

Mixing is commenced (zero elapsed time) at 62 r.p.m. and 50 p.s.i. ram pressure. After 30 seconds elapsed time, the ram is raised with mixing continued and the following are added (about 75 seconds required):

| Component | Grams | Parts |
|---|---|---|
| FEF Black | 278 | 30 |
| MT Black | 157 | 17 |
| Petroleum oil (same) | 286 | 31 |

After about 1 min. and 45 seconds total elasped time, the ram is lowered to apply 50 p.s.i. and mixing continues to about 3 min. and 30 sec. total elapsed time, at which time the Banbury throat is cleaned (excess black and oil pushed into chamber). The ram is then relowered and mixing continues to about 4 min. total elapsed time. At that point the speed is increased to 85 r.p.m. and mixed until 7 min. total elapsed time, when the masterbatch is discharged at about 260° F.

The masterbatch is compounded on a rubber roll mill in accordance with the following formulations to give Stocks A and B. For comparison, a Stock X (outside the invention) is prepared which does not contain either the thiourea or condensation product components.

| Component: | Parts |
|---|---|
| Sulfur | 2 |
| Tetramethyl thiuram disulfide | 0.75 |
| Dipentamethylene thiuram tetrasulfide | 0.75 |
| 2-Mercaptobenzothiazole | 1.5 |
| N,N'-dibutyl thiourea ["Pennzone B"] | [1] 1.0 |
| Butyraldehyde-butylamine condensation product ["833"] | [2] 1.0 |

[1] Stock A only.
[2] Stock B only.

The resulting compositions exhibited the following processing safety characteristics:

| Mooney Scorch at 250° F. | A | B | X* |
|---|---|---|---|
| Minimum | 23 | 21 | 23 |
| Minutes to 10-point rise | 8 | 8 | 16 |

They are then cured at 290° F. for a 10-minute period. Typical ODR torque data obtained for this are as follows:

| ODR at 290° F. | A | B | X* |
|---|---|---|---|
| Torque at— | | | |
| 2.5 min | 6 | 5 | 3 |
| 5 min | 35 | 25 | 7 |
| 7.5 min | 50 | 35 | 30 |

The vulcanizates exhibit the following properties at 25° C.

| 10'/290° F. Cure | A | B | X* |
|---|---|---|---|
| Modulus at 300% Ext. (p.s.i.) | 1,175 | 975 | 1,100 |
| Tensile Strength (p.s.i.) | 1,800 | 1,800 | 1,725 |
| Elongation at Break (percent) | 540 | 680 | 610 |
| Permanent Set at Break (percent) | 13 | 24 | 16 |
| Shore A Hardness | 62 | 60 | 61 |
| Bloom after 30 Days | None | None | Slight |

Vulcanizates obtained by a 10-minute cure at 320° F. exhibit the following properties:

| 10'/320° F. Cure | A | B | X* |
|---|---|---|---|
| Modulus at 300% Ext. (p.s.i.) | 1,550 | 1,375 | 1,575 |
| Tensile Strength (p.s.i.) | 1,800 | 1,750 | 1,700 |
| Elongation at Break (percent) | 390 | 460 | 370 |
| Permanent Set at Break (percent) | 8 | 12 | 7 |
| Shore A Hardness | 66 | 63 | 64 |
| Bloom | None | None | Slight |

*Outside the invention; for comparison only.

If for further comparison, the compound N,N,N'-trimethyl thiourea is substituted for the dibutyl thiourea above, the results will closely resemble stock X both in regard to bloom and curing behavior.

The examples taken as a whole show that bloom can be avoided by the use of N,N'-dibutyl thiourea, alternative activators either causing severe bloom (for example, N,N'-diphenyl thiourea) or, if not causing bloom, proving less satisfactory because they are less effective in promoting early curing and subsequent development of the desired state of cure.

It is possible that the curing system of this invention would be beneficial when used on ethylene, propylene copolymers wherein the unsaturation is supplied by cyclooctadiene-1,5 units or dicyclopentadiene units.

As many widely different embodiments of this invention may be made without departing from the spirit and scope thereof, it is to be understood that this invention is not limited to the specific embodiments thereof except as defined in the appended claims, and all changes which come within the meaning and range or equivalence are intended to be embraced therein.

What is claimed is:

1. In the process of curing black-loaded copolymers of ethylene containing units of at least one open-chain, non-conjugated hydrocarbon diene and having at least about 0.3 gram-mole of carbon-carbon double bonds per kilogram of copolymer in the presence of (a) sulfur, (b) zinc oxide, (c) mecaptobenzothiazole or 2,2'-dithiobisbenzothiazole, and (d) a compound selected from the group consisting of (1) tetramethyl thiuram disulfide, (2) tellurium diethyl dithiocarbamate, (3) dipentamethylene thiuram tetrasulfide, (4) zinc dibutyl dithiocarbamate, and mixtures thereof, the improvement of incorporating (A) N,N'-dibutyl thiourea, or (B) a butylraldehyde-butylamine condensation product prior to curing.

2. The process improvement as defined in claim 1 wherein said copolymer is a terpolymer of ethylene, propylene and 1,4-hexadiene which contains about 0.3 gram-mole of carbon-to-carbon double bonds per kilogram.

3. In a black-loaded composition curable to vulcanized elastomer comprising a copolymer of ethylene containing units of at least one open-chain non-conjugated hydrocarbon diene and having at least about 0.3 gram-mole of carbon-carbon double bonds per kilogram of copolymer, (a) sulfur, (b) zinc oxide, (c) mecaptobenzothiazole or 2,2'-dithiobisbenzothiazole, and (d) a compound selected from the group consisting of (1) tetramethyl thiuram disulfide, (2) tellurium diethyl dithiocarbamate, (3) dipentamethylene thiuram tetrasulfide, (4) zinc dibutyl dithiocarbamate and mixtures thereof, the improvement of incorporating (A) N,N'-dibutyl thiourea or (B) a butyraldehyde-butylamine condensation product prior to curing.

4. The process improvement as defined in claim 1 wherein (B) is incorporated prior to curing.

5. The composition of claim 3 wherein (B) is incorporated prior to curing.

References Cited

UNITED STATES PATENTS

| 2,382,813 | 8/1945 | Paul | 260—795 |
| 3,317,918 | 5/1967 | Foster | 260—83.7 |
| 3,355,417 | 11/1967 | Martin | 260—41 |
| 3,303,172 | 2/1967 | Schreiber | 260—79.5 |

FOREIGN PATENTS

| 1,455,518 | 9/1966 | France. |

JOSEPH L. SCHOFER, Primary Examiner

C. A. HENDERSON, Jr., Assistant Examiner

U.S. Cl. X.R.

260—41.5, 785, 793, 794, 796